United States Patent
O'Connor

(10) Patent No.: US 9,462,784 B2
(45) Date of Patent: Oct. 11, 2016

(54) INSECT BARRIER PET BOWL ASSEMBLY
(75) Inventor: Lee Zeke O'Connor, St. Lucia (AU)
(73) Assignee: Julie Herbert, Auckland (NZ)
(*) Notice: Subject to any disclaimer, the term of this patent is extended or adjusted under 35 U.S.C. 154(b) by 355 days.
(21) Appl. No.: 14/239,592
(22) PCT Filed: Sep. 7, 2012
(86) PCT No.: PCT/AU2012/001066
§ 371 (c)(1),
(2), (4) Date: Feb. 19, 2014
(87) PCT Pub. No.: WO2013/033781
PCT Pub. Date: Mar. 14, 2013
(65) Prior Publication Data
US 2014/0165919 A1    Jun. 19, 2014
(30) Foreign Application Priority Data
Sep. 9, 2011   (AU) ............................. 2011903705
(51) Int. Cl.
*A01K 5/00*       (2006.01)
*A01K 5/01*       (2006.01)
*A01M 29/12*      (2011.01)
*A01M 29/34*      (2011.01)
(52) U.S. Cl.
CPC ............ *A01K 5/0142* (2013.01); *A01M 29/12* (2013.01); *A01M 29/34* (2013.01)
(58) Field of Classification Search
CPC .... A01K 5/01; A01K 5/0114; A01K 5/0135; A01K 5/0142
USPC ........... 119/51.01, 61.5, 61.51, 61.53, 61.54, 119/51.5
See application file for complete search history.

(56) References Cited

U.S. PATENT DOCUMENTS

| | | | | |
|---|---|---|---|---|
| 3,441,003 A * | 4/1969 | Lister | .................. | A01K 5/0114 119/61.53 |
| 3,995,595 A * | 12/1976 | Williams | ............. | A01K 5/0142 119/61.53 |
| 4,784,086 A * | 11/1988 | Hand | ................... | A01K 5/0142 119/61.53 |
| 5,148,626 A * | 9/1992 | Haake, Sr. | ........... | A01K 5/0142 119/61.53 |
| 5,285,749 A * | 2/1994 | Byer | .................... | A01K 5/0142 119/61.53 |
| 5,619,952 A * | 4/1997 | Walker | ................. | A01K 5/0142 119/61.53 |
| 5,794,564 A * | 8/1998 | Paro | ..................... | A01K 5/0135 119/61.53 |
| 5,857,428 A * | 1/1999 | Gitzen | ................. | A01K 5/0114 119/61.53 |
| 6,065,428 A * | 5/2000 | Fronk | .................. | A01K 5/0142 119/61.53 |
| 6,167,840 B1 * | 1/2001 | White | ................... | A01K 5/0142 119/61.53 |
| 6,460,288 B1 * | 10/2002 | Chow | .................. | A01K 5/0142 119/61.53 |
| 6,478,277 B2 * | 11/2002 | Winquest | ............. | A01K 5/0142 119/61.53 |
| 6,915,761 B1 * | 7/2005 | Campbell | ............ | A01K 5/0114 119/51.01 |

* cited by examiner

*Primary Examiner* — Richard Price, Jr.
(74) *Attorney, Agent, or Firm* — Bishop Diehl & Lee, Ltd.

(57) ABSTRACT

A bowl assembly (2) includes a bowl (4) which is suitable for holding various types of produce but which is intended for receiving food for a pet. The bowl assembly (2) is supported upon a tray (6). Four legs (8) are disposed to support the tray and are of sufficient length to elevate the tray a distance above the reach of ants (11). An insect deterrent (12) is located on the underside of the tray around the juncture of each leg (8) with the tray (6) to prevent insects proceeding along the legs to the tray. The legs (8) depend downwards and respectively terminate in bayonet heads (16) (best seen in FIG. 2) that are received into complementary sockets (14) formed in the topside of base plate (10).

13 Claims, 6 Drawing Sheets

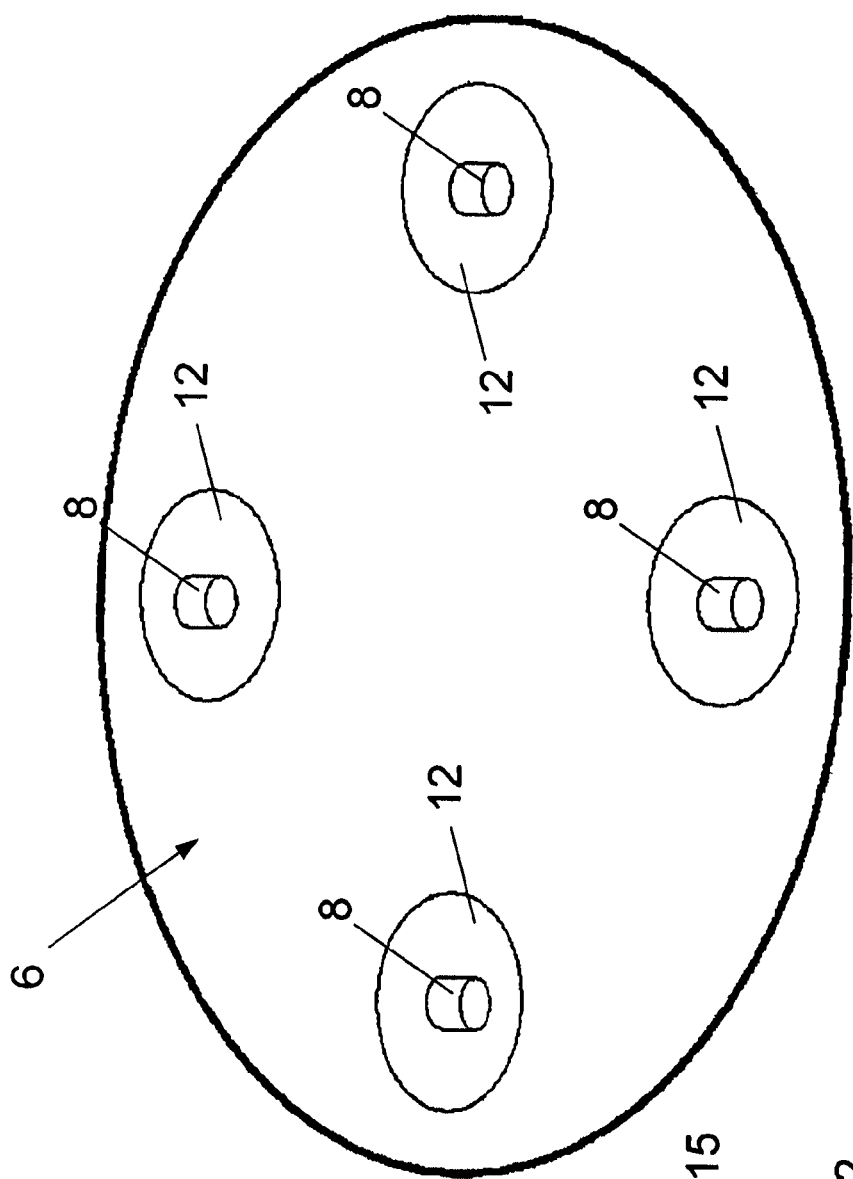
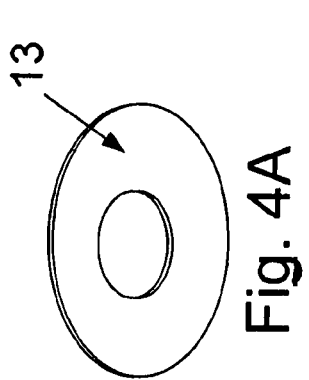
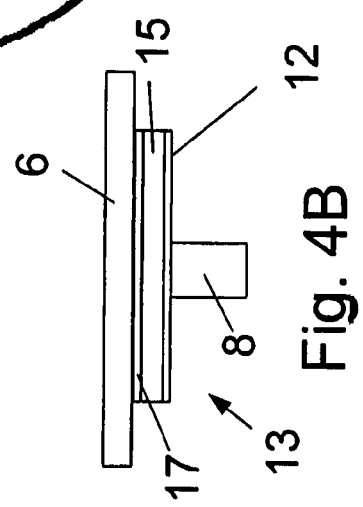
Fig. 4
Fig. 4A
Fig. 4B

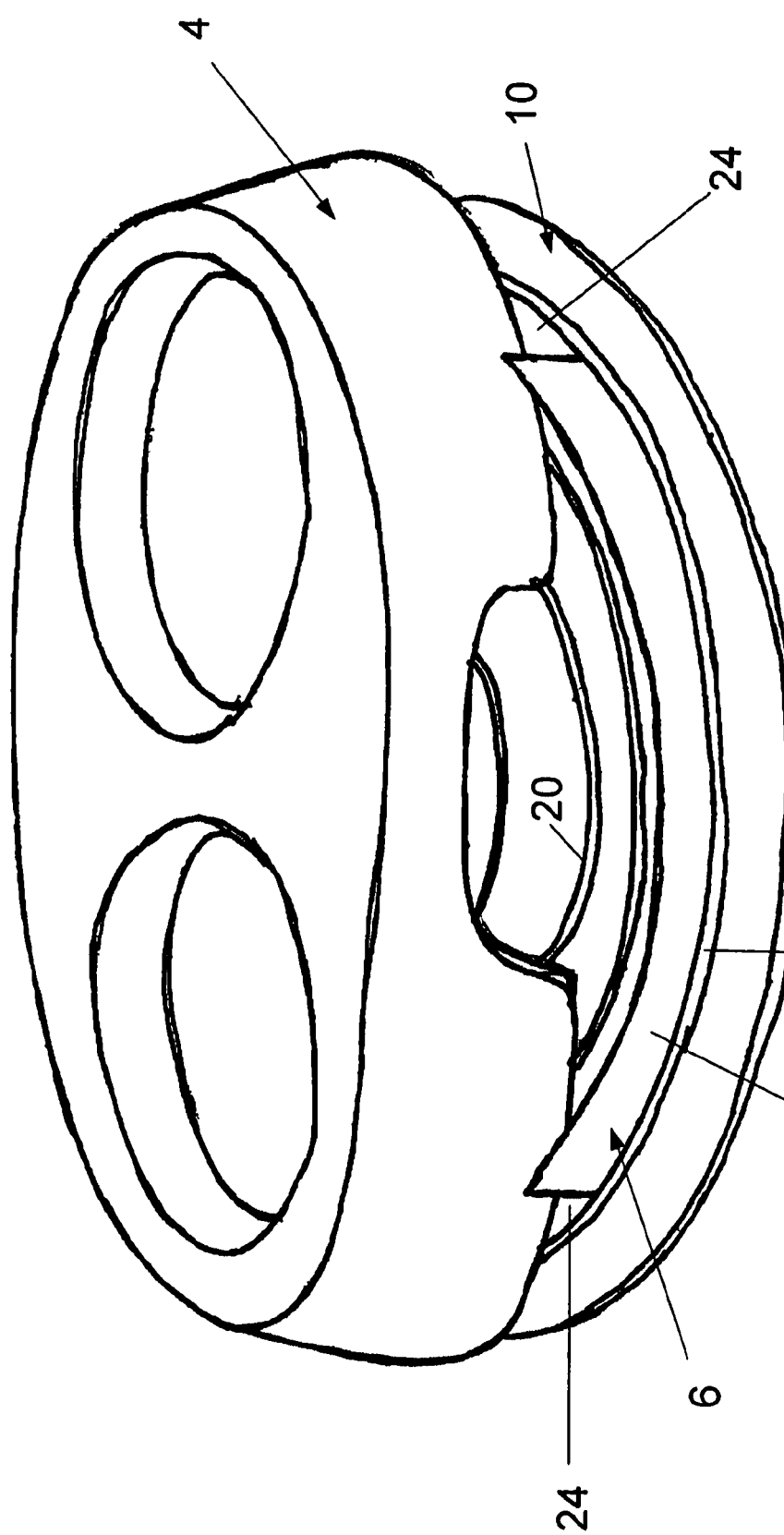

INSECT BARRIER PET BOWL ASSEMBLY

TECHNICAL FIELD

The present invention is directed to a bowl assembly to keep food within the bowl free of crawling insects such as ants, roaches and the like. Particular embodiments of the invention find application as pet bowl assemblies for keeping pet food free of crawling insects.

BACKGROUND ART

Any references to methods, apparatus or documents of the prior art are not to be taken as constituting any evidence or admission that they formed, or form part of the common general knowledge.

It is common practice to feed domestic animals such as cats and dogs by using food dishes or bowls. In areas where ants and other crawling insects are prevalent a trail of insects may form from the area surrounding the bowl to the food located therein. Contamination by insects causes the food to go to waste.

Various approaches are known to address this problem. For example, one common approach is to locate the pet bowl in a shallow dish which is filled with water to thereby form a moat that the insects cannot cross. A problem with this arrangement is that while feeding the pet may cause the water to splash on the surrounding ground. A further problem is that food in the dish may spill into the surrounding water and thereby foul it so that it needs to be frequently replenished.

Other approaches to address the problem have also been documented in the prior art. For example, in U.S. Pat. No. 5,109,800 there is described a pet bowl assembly which includes a base with a central support section around which a circuit of insect barrier is located. The base supports a detachable food bowl which is secured to the base by hook and loop fastening system.

However, a considerable amount of insect deterrent must be used to surround the base. Furthermore, the base is of relatively small diameter so that the stability of the bowl is called into question. A further problem is that the bowl must be custom built for the base.

It would be advantageous if a bowl assembly were provided that overcame the problems of the prior art that are discussed above or which was at least a useful alternative to those bowl assemblies that have hitherto been know and which are designed to address the problem of food contamination by crawling insects.

SUMMARY OF THE INVENTION

According to a first aspect of the present invention there is provided a bowl assembly including:
- a bowl for receiving food for a pet;
- a tray arranged to support the bowl;
- one or more legs disposed to support the tray and of length sufficient to elevate the tray a distance above the reach of ants; and
- insect deterrent located to prevent insects proceeding along the one or more legs to the tray.

Preferably the bowl assembly further includes a baseplate located beneath the tray wherein the one or more legs extend between the tray and the base plate.

In a preferred embodiment of the invention the one or more legs depend downward from the tray.

Preferably the one or more legs are received into complementary sockets formed upon the base plate.

In a preferred embodiment of the invention a perimeter of the base plate extends beyond a perimeter of the tray about the entire perimeter of said tray.

Preferably the insect deterrent is located upon an underside of the tray.

The insect deterrent is preferably located about each of the one or more legs.

In a preferred embodiment the insect deterrent is located to enclose junctures of the one or more legs with the tray.

Preferably the tray is provided with a lip around its underside to protect the insect deterrent.

Alternatively, the insect deterrent may be located about the circumferences of the one or more legs.

Furthermore, the insect deterrent may be located to enclose junctures of the one or more legs with the base plate.

Preferably an upper side of the tray includes retention formations for preventing sliding of the bowl relative thereto.

The retention formations may include a number of ridges or ribs extending from the upper side of the tray.

In a preferred embodiment the upper side of the tray includes a number of outer wall portions to assist in retaining the bowl upon the tray.

The insect deterrent may include any one of diatomaceous earth, tangle foot horticultural glue, Teflon, trans-2-nonenal, spearmint or petroleum jelly.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 4 is an isometric, and somewhat stylized, view of the underside of the tray of FIG. 2.

FIG. 4A is an isometric view of an adhesive pad for applying insect deterrent to the base plate in a further embodiment of the present invention.

FIG. 4B is a side view of the adhesive pad of FIG. 4A showing a central media of card or plastic for example sandwiched by insect deterrent layer on one side and an adhesive layer on the other side.

FIG. 5 is a view of the bowl assembly of FIG. 1 from above and to the side.

DETAILED DESCRIPTION OF PREFERRED EMBODIMENTS

Figure 1:
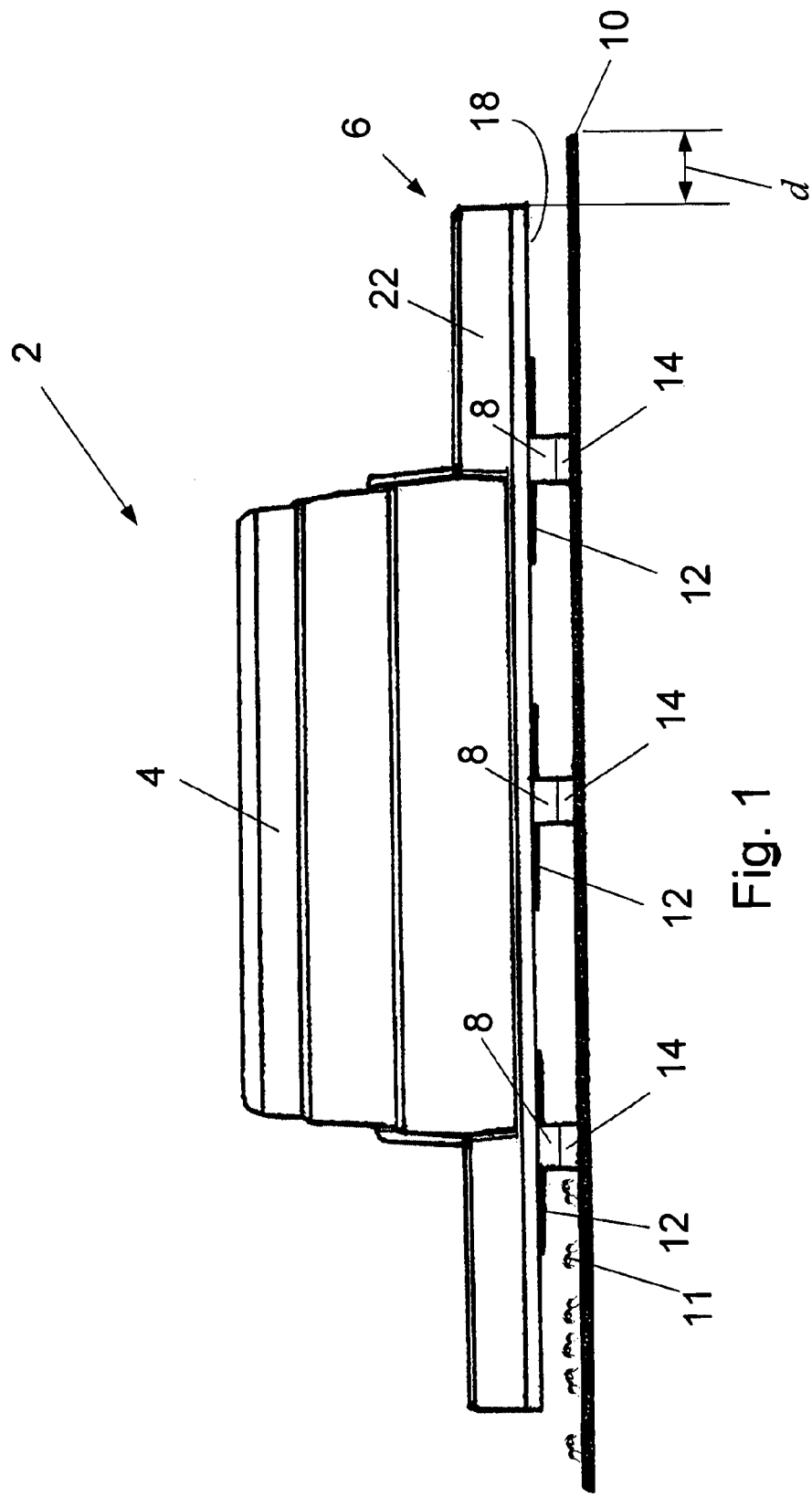
FIG. 1 is a side view of a bowl assembly according to a preferred embodiment of the present invention.

Referring now to FIG. 1, there is depicted a preferred embodiment of a bowl assembly 2 according to the present invention. The bowl assembly 2 includes a bowl 4 which is suitable for holding various types of produce but which is intended for receiving food for a pet. The bowl assembly 2 is supported upon a tray 6.

Four legs 8 are disposed to support the tray and are of sufficient length to elevate the tray a distance above the reach of ants 11. For example in Australia ants which are likely to be a pest in pantries and the like are typically around 3 mm in length so a height of around 15 mm is sufficient elevation. Of course, a fewer, e.g. three, or greater, number of legs could be present in a variation of the invention.

In the presently described preferred embodiment of the invention the legs 8 are integrally formed with the underside of the tray 6. The legs 8 depend downwards and respectively terminate in bayonet heads 16 (best seen in FIG. 2) that are received into complementary sockets 14. The sockets 14 (best seen in FIG. 3) that are integrally formed in the topside of base plate 10.

An insect deterrent 12 is located on the underside of the tray around the juncture of each leg 8 with the tray 6 to prevent insects proceeding along the legs to the tray. The deterrent, for example diatomaceous earth is located in regions 12 which are firstly roughened, for example by sanding them and then having the diatomaceous earth rubbed into the roughened area. In alternative embodiments the insect deterrent might be located at other positions. For example, the insect deterrent may be located about the circumferences of the legs or over the entire, or a substantial portion of, the underside of tray 6.

The tray 6 is provided with a lip 18 around its underside to protect the insect deterrent 12.

Figure 2:
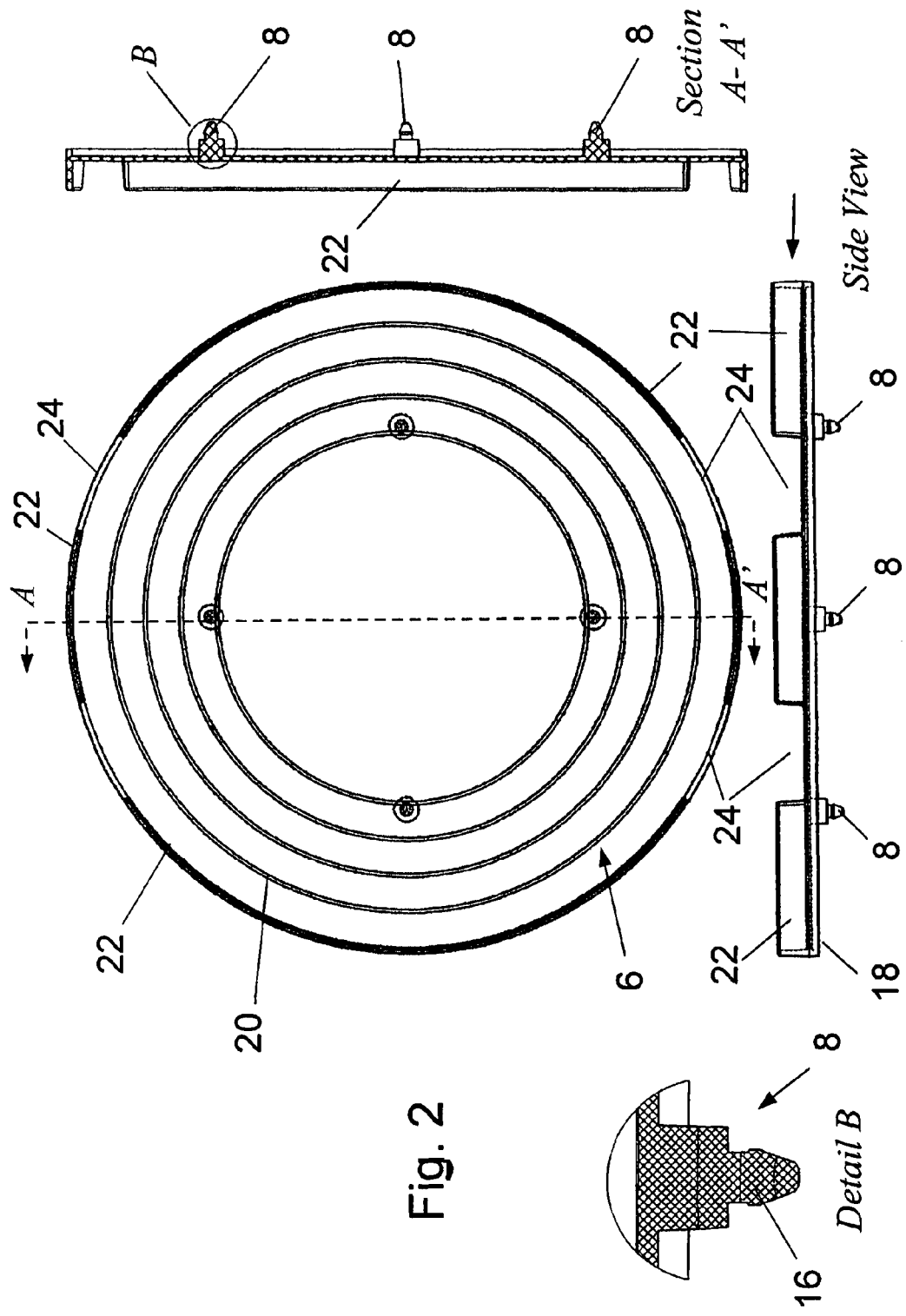
FIG. 2 is a top plan view of a tray of the bowl assembly of FIG. 1.
Figure 3:
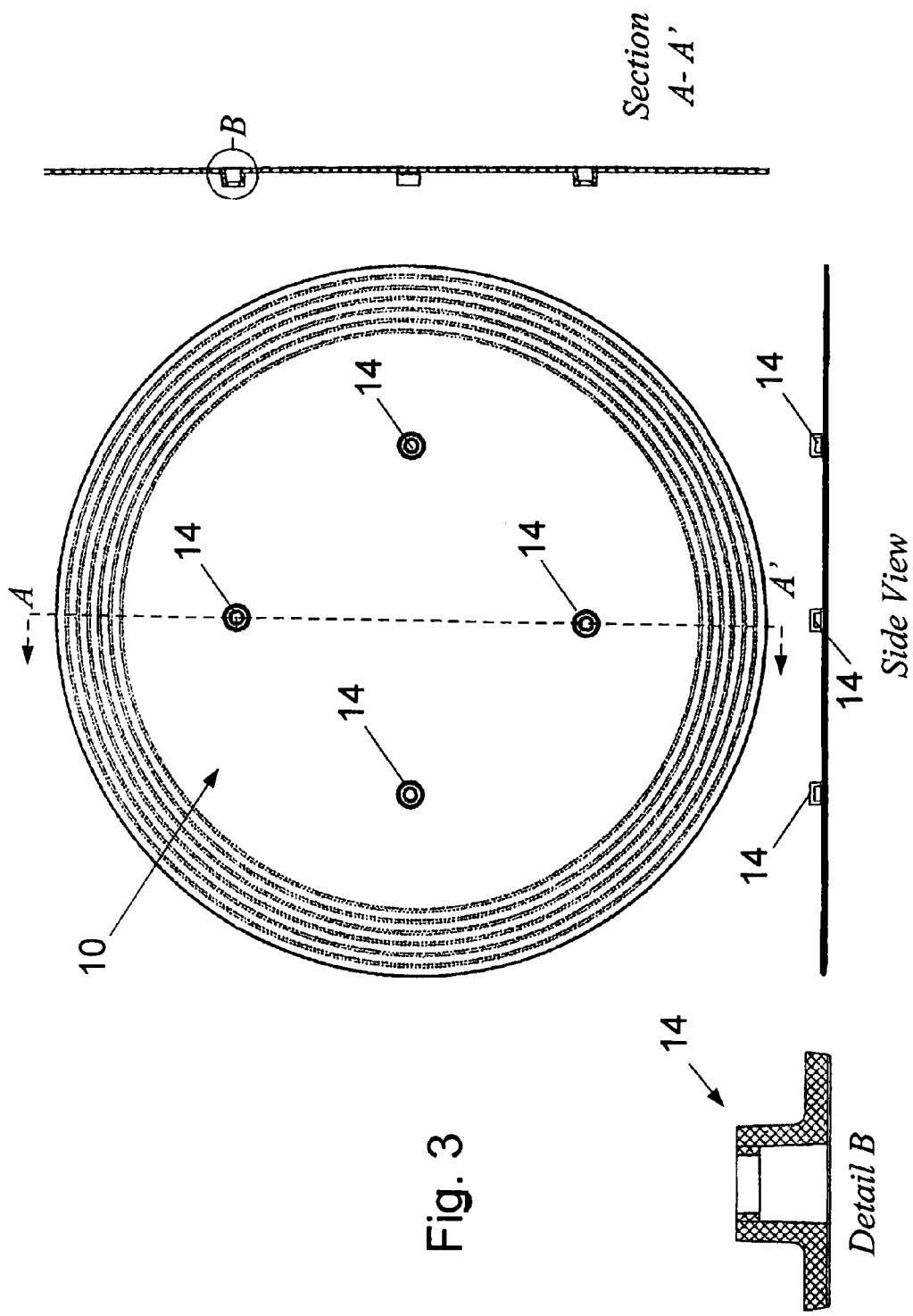
FIG. 3 is a top plan view of a base plate of the bowl assembly of FIG. 1.

FIG. 4 is an isometric, and somewhat stylized, view of the underside of the tray of FIG. 2 wherein circular regions of insect deterrent 12 may be seen FIG. 4A is an isometric view of an adhesive pad for applying insect deterrent to the base plate in a further embodiment of the present invention.

FIG. 4B is a side view of the adhesive pad of FIG. 4A attached on the underside of the tray 6 about a leg 8. The pad 13 includes a central media of plastic, for example, sandwiched by insect deterrent layer 12 on one side and an adhesive layer 17 on the other side capable of adhering to the tray, e.g. a plastic adhesive. The pad 13 is stuck around leg 8 onto the underside of the tray 6 to provide the insect deterrent layer.

This method of using a pad to apply the insect deterrent has been found to be more convenient during manufacture than applying the deterrent directly to the tray.

The insect deterrent may include any one of diatomaceous earth, tangle foot horticultural glue, Teflon, trans-2-nonenal, spearmint, petroleum jelly or any other suitable insect deterrent.

With reference to FIG. 1, it will be observed that a perimeter of the base plate extends a distance "d" beyond a perimeter of the tray about the entire perimeter of said tray. Consequently, when the base plate 10 is pushed up against a wall for example, the tray 6 is kept away from the wall so that the wall does not provide an access way for ants to the tray 6.

The upper side of the tray 6 includes retention formations in the form of ridges or ribs 20 for preventing sliding of the bowl 5 as a cat or dog eats from it, for example. About the periphery of the upper side of the tray 6 there are located a number of outer wall portions 22. These outer wall portions also assist in retaining the bowl 4 on the topside of the tray.

Furthermore, since there are breaks 24 between the outer wall portions 22, an oversized bowl may be received on top of the tray with the lower edges of the bowl passing through the breaks as shown in FIG. 5.

In use the bowl assembly 2 is located in an area where a pet is to be fed. Food is placed in dish 4. Ants 11, or other crawling insects, that are drawn to the scent of the food may make their way to the upper side of base plate 10 as shown in FIG. 1.

However, should they attempt to climb legs 8 to reach the underside of tray 6 then at the juncture of the legs 8 with the tray 6 they will encounter the insect deterrent material 12. Since the insect deterrent material is located on the underside of the tray 6 and is disposed in a relatively wide area about the junctures of the legs 8 with the underside of the tray 6, the insects are prevented from proceeding along the underside of the tray 6 and up and over its topside to the food bowl 4.

Figure 6:
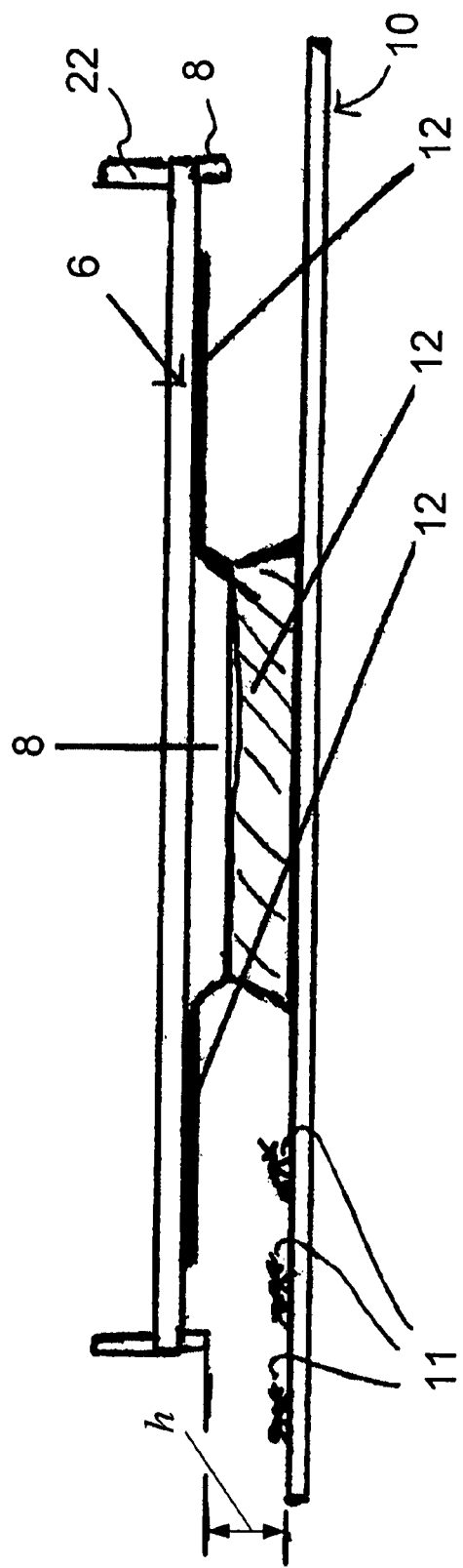
FIG. 6 is a side view of portion of a bowl assembly according to a further embodiment of the invention.

Referring now to FIG. 6, there is depicted a further embodiment of the invention. Like item numbers are used in FIG. 6 to refer to like parts and features of that are common with the embodiment of FIGS. 1 to 5. It will be noted that the embodiment of Figure six has a single central leg 8 rather than the four separate legs of the first embodiment. The central leg keeps the tray 6 spaced a distance "h" above the baseplate 10 where "h" is too great for ants 11 to reach from the baseplate 10 to the tray 6. Furthermore, ant-deterrent 12 is disposed both around the circumference of the leg 8 and also on the underside of the tray 6 as shown.

It will be realized that there are many possible variations to the embodiments shown in the figures. For example, the entire underside of the tray 6 might be covered with insect deterrent. Alternatively, the insect deterrent could be disposed around the trunks of the legs 8 or on the topside of the baseplate 10 to prevent the insects from reaching the legs 8.

Furthermore, although diatomaceous earth is the preferred insect deterrent the inventor has found that other compounds may be used such tangle foot horticultural glue, Teflon, trans-2-nonenal, spearmint or petroleum jelly.

In light of the abovementioned variations, it will be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

In compliance with the statute, the invention has been described in language more or less specific to structural or methodical features.

The term "comprises" and its variations, such as "comprising" and "comprised of" is used throughout in an inclusive sense and not to the exclusion of any additional features.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. An assembly configured to deter crawling insects, the assembly comprising:
   a tray configured to support a dish;
   the dish configured to receive food;

one or more legs disposed to support the tray, wherein the one or more legs are of length sufficient to elevate the tray a distance above the reach of crawling insects; and insect deterrent located on a roughened region about a circumference of each of the one or more legs to deter crawling insects proceeding beyond the one or more legs to the tray; and wherein the insect deterrent comprises diatomaceous earth.

2. The bowl assembly according to claim 1, wherein the insect deterrent is located upon an underside of the tray.

3. The bowl assembly according to claim 1, further including a base plate located beneath the tray wherein the one or more legs extend between the tray and the base plate.

4. The bowl assembly according to claim 3, wherein the one or more legs are received into complementary sockets formed upon the base plate.

5. The bowl assembly according to claim 3, wherein a perimeter of the base plate extends beyond a perimeter of the tray.

6. The bowl assembly according to claim 1, wherein the insect deterrent is located where the one or more legs join the tray.

7. The bowl assembly according to claim 1, wherein the tray is provided with a lip around its underside to protect the insect deterrent.

8. The bowl assembly according to claim 3, wherein the insect deterrent is located where the one or more legs join the base plate.

9. The bowl assembly according to claim 1, wherein an upper side of the tray includes retention formations for preventing sliding of the bowl relative thereto.

10. The bowl assembly according to claim 9, wherein the retention formations include a number of ridges or ribs extending from the upper side of the tray.

11. The bowl assembly according to claim 1, wherein the upper side of the tray includes a number of outer wall portions to assist in retaining the bowl upon the tray.

12. The bowl assembly according to claim 1, wherein the insect deterrent further comprises any one of tangle foot horticultural glue, Teflon, trans-2-nonenal, spearmint or petroleum jelly.

13. The bowl assembly according to claim 1 wherein the insect deterrent is borne on a media adhered to the tray.

* * * * *